Feb. 19, 1929.

J. L. STULL ET AL 1,702,324

SCRAPER

Filed April 25, 1927　　　2 Sheets-Sheet 1

Inventor

J. L. Stull
C. E. Stull

By Lacey & Lacey, Attorneys

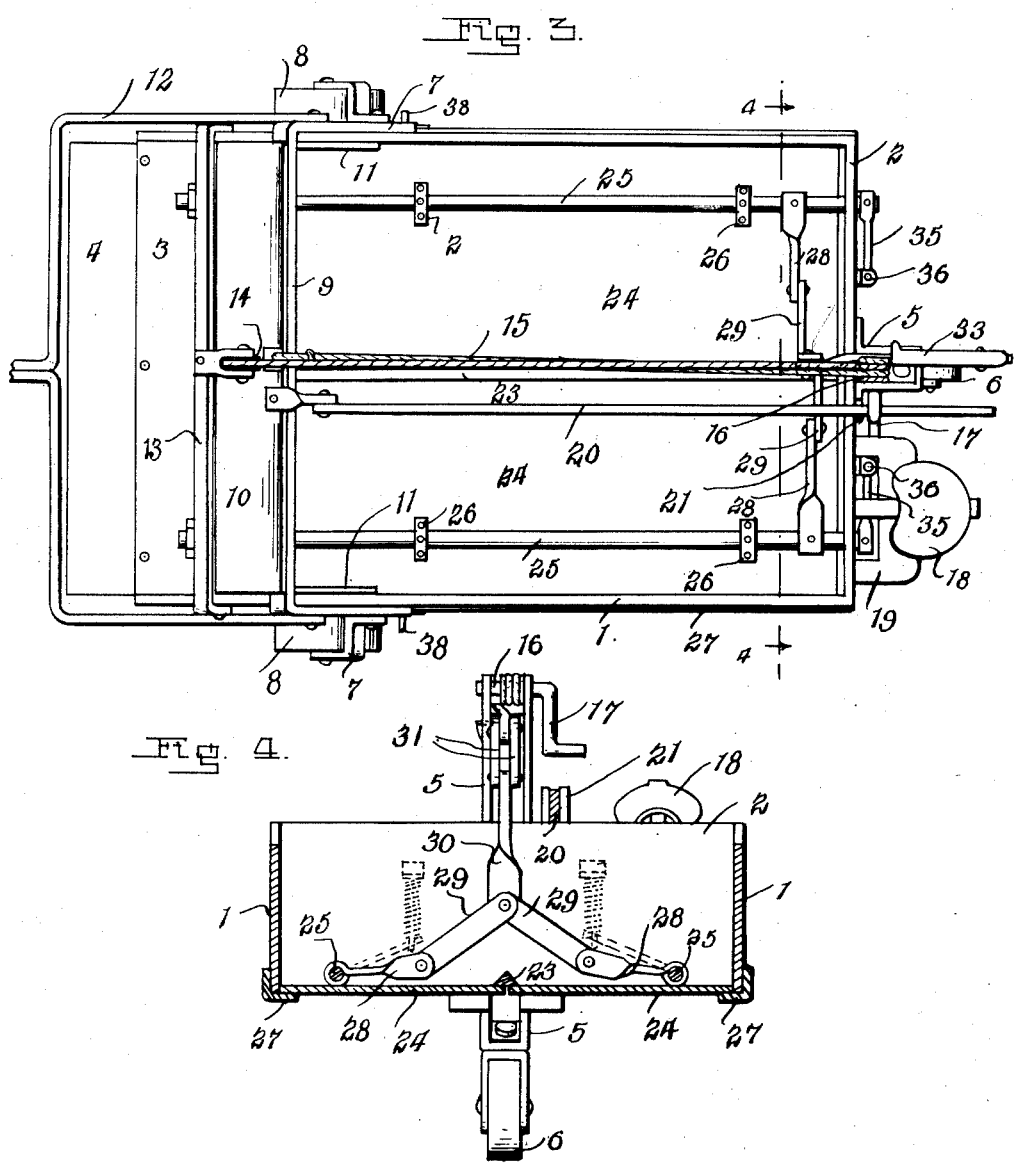

Patented Feb. 19, 1929.

1,702,324

UNITED STATES PATENT OFFICE.

JOHN L. STULL AND CHARLES E. STULL, OF CARLISLE, INDIANA.

SCRAPER.

Application filed April 25, 1927. Serial No. 186,452.

This invention relates to excavating scrapers and has for its object the provision of a scraper which may be drawn over the ground to take up the surface soil and easily adjusted when filled to support the load. Another object of the invention is to provide novel means whereby, when the loaded scraper is raised to load-carrying position, and end gate or hood will be disposed across the front end of the device to prevent premature escape of the load. The invention also provides means whereby the load may be dumped through the bottom of the scraper without necessitating tilting of the scraper. Other objects will appear incidentally in the course of the following description, and the invention resides in certain novel features which will be particularly pointed out in the appended claims.

In the drawings:

Fig. 3 is a top plan view of the scraper, and

Fig. 4 is a transverse section on the line 4—4 of Fig. 3.

Figure 1:
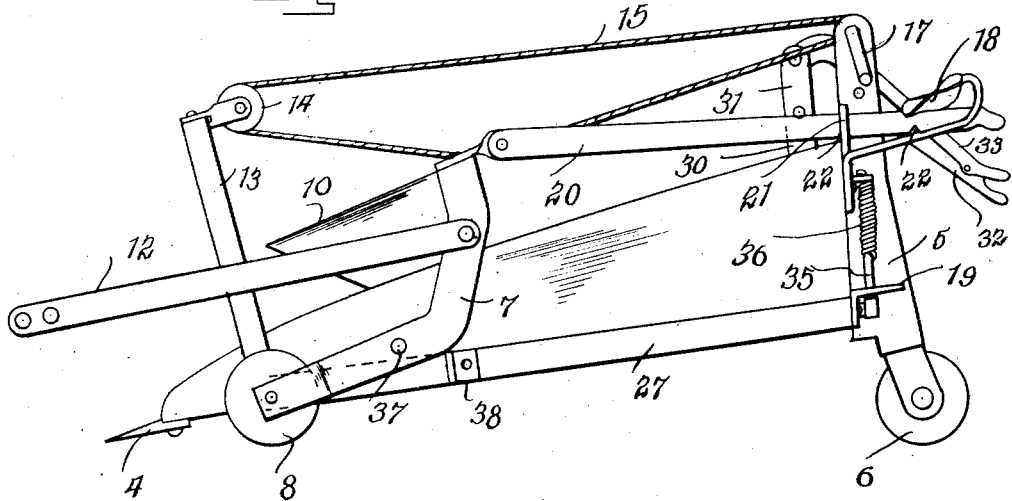
Figure 1 is a side elevation of a scraper embodying our invention and showing the same in the excavating position.
Figure 2:
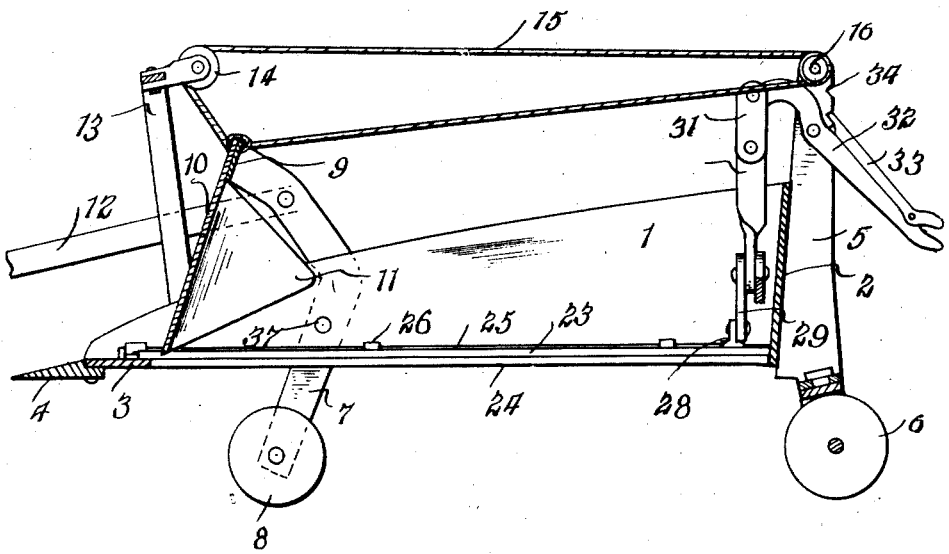
Fig. 2 is a central longitudinal section showing the scraper adjusted to the load-carrying position.

In carrying out the invention, we provide side plates 1 which are connected at their rear ends by a back 2 which may be made integral with the sides or secured thereto in any convenient or preferred manner. At their front ends, the side plates are connected at their lower edges by a cross plate 3 to which a blade 4 is rigidly secured, the blade being removable so that it may be sharpened when necessary. Secured rigidly upon the back plate 2 at the center thereof is a standard or post 5 which is substantially U-shaped and has a caster 6 swiveled in its lower end whereby the rear end of the scraper will be supported in such manner that it may be easily drawn over the ground and the caster will readily follow the path of the scraper. Pivotally mounted upon each side plate 1 near the front end thereof is a leg 7 of an angular formation clearly shown in Figs. 1 and 2 and carrying a ground wheel 8 at its lower end. The upper end of the leg 7 extends above the side plate and the said ends of the two legs are connected by a cross bar 9 bridging the scraper so that a bail is formed to which is secured an end gate or hood 10. This end gate is rigidly attached to the bail so that it will follow the movements of the same and at its ends is provided with wings 11 which, when the end gate is in its operative position, are adapted to cover the open space between the upper edge of the respective side plate 1 and the upper portion of the adjacent leg, as clearly shown in Fig. 2, whereby escape of dirt over the sides of the scraper will be prevented. A draft device 12 is secured to the legs 7 and extends forwardly therefrom to be attached to a draft team or to a tractor, and this draft member is preferably in the form of a bail, as clearly shown in Fig. 3, and has its ends pivoted to the legs so that it will maintain its operative position notwithstanding the pivotal adjustment of the legs. There is also secured to the side plates in advance of the legs 7 an arched frame 13 at the center of which is mounted a guide roller 14 about which is trained a cable 15 which has its ends secured to the bail 9 or the end gate 10 and its intermediate portion secured to and wound about a drum 16 which is mounted in the upper end of the post or standard 5. The drum shaft is equipped with a crank handle 17 at one end whereby it may be easily manipulated from the driver's seat 18 which is carried upon the rear end of the scraper, a foot rest 19 being secured upon the back plate 2 below the seat, as shown. A latch bar 20 is also provided, the front end of this bar being pivotally connected to the end gate or hood at the upper edge thereof and its rear portion playing through a guide 21 on the back plate 2 and having notches 22 formed in its lower edge to engage the upper edge of the back plate whereby the end gate or hood may be held in its raised or its lowered position.

Extending from the front cross plate 3 to the back plate 2 at the lower edge thereof is a divider bar 23 of triangular cross section, as shown clearly in Fig. 4, whereby the load taken up by the scraper will be prevented from sifting between the opposed inner edges of the doors 24 which constitute the bottom or load-carrying members of the scraper. These doors are carried by rock shafts 25 extending longitudinally of the device and having their ends rotatably mounted upon the cross plate 3 and the back plate 2, as will be understood, brackets or clamping plates 26 securing the dumping doors rigidly to the shafts so that any rocking movement of the shafts will be transmitted to the doors and the load thereby dumped. It will be noted upon reference to Fig. 4 that the inner edges of the doors bear against the under side of the divider bar 23 while their outer edges are adapted to abut angle bars 27 secured to the side plates 1 adjacent the lower edges of the same, leakage of the load around the outer edges of the dumping doors being thereby prevented. Adjacent the rear ends of the shafts 25, cranks 28 are rigidly secured thereto and to the inner ends of these cranks are pivoted links 29 which extend inwardly and have a common pivotal connection with the lower end of a pitman 30, the upper end of which is connected through a link or links 31 with a hand lever 32 mounted upon the standard or post 5 and equipped with a latch 33 adapted to engage notches 34 in the standard whereby the doors will be prevented from dumping prematurely under the weight of the load but may be easily permitted to open when the load is to be dumped. The rear ends of the shafts 25 project through the back plate 2 of the scraper and have levers or crank arms 35 secured thereto, the said levers or crank arms extending inwardly and being connected with the back plate through springs 36 whereby the doors tend constantly to remain in the load-carrying position, as will be understood upon reference to Fig. 4.

It is thought the use of the device will be readily understood. When a load is to be taken up, the drum 16 is rotated so that the end gate or hood 10 will be swung to the position shown in Fig. 1, and this operation obviously causes the legs 7 to swing about their pivots 37 so that the ground wheels 8 are swung to positions in advance of their pivots and the front end of the scraper consequently lowered so that the blade 4 will be arranged to cut into the soil and cause the same to enter the scraper as the latter is pulled forward. The latch bar 20 is, of course, disengaged from the back plate 2 of the scraper when the drum 16 is to be rotated and as the hood reaches the upper limit of its movement the forward notch 22 of said latch bar will engage the back plate and thereby serve to hold the hood in its raised position, accidental release of the hood by failure of the drum to remain stationary being thereby avoided. The scraper is then drawn over the ground in the usual manner to take up a load and when it is filled the drum 16 is rotated in the opposite direction so that the hood and the legs 7 will be swung to the position shown in Fig. 2. This movement of the hood causes it to extend across the front end of the scraper and thereby retain the load therein and the legs 7 will swing downwardly and rearwardly so that they serve as levers to lift the front end of the scraper into load supporting and carrying position. Lugs 38 on the sides of the scraper constitute stops to limit the relative rearward swinging movement of the legs so that they cannot assume a position in which the drum 16 and cable 15 will not act promptly and properly to set the hood. The load is then drawn to the place of deposit and the hand lever 32 swung upwardly to permit the dumping doors 24 to swing downwardly and discharge the load, it being obvious that, if necessary, the hood 10 may be slightly raised prior to the opening of the doors in order to avoid interference with their movement. It is also possible to return the hood to its inoperative position shown in Fig. 1 simultaneously with the dumping of the load, and this operation will be advantageous under conditions where it is possible to excavate in both directions so that it will not be necessary to return the scraper to the starting point without performing work.

The apparatus is very simple and compact and easily manipulated.

Having thus described the invention, we claim:

1. In an excavating scraper, the combination of a carrier comprising side plates and a back plate, a cross plate connecting the side plates at the front ends thereof, rock shafts mounted in said front cross plate and in the back plate, dumping doors carried by said rock shafts, yieldable connections between the rear ends of the rock shafts and the back plate whereby doors are normally held in load-carrying position, cranks connected to the rock shafts, a hand lever mounted above the back plate, and link connections between the lever and the said cranks to swing the doors to dumping position.

2. In an excavating scraper, the combination of a scraper body, a rolling support for the rear end of the body, legs pivotally mounted upon the sides of the body near the front ends thereof and extending above the body, ground wheels carried by the lower ends of said legs, a hood carried by the upper ends of the legs and fitting within the body, and means mounted on the body whereby to normally hold the hood in raised position and the upper ends of the legs lowered whereby to support the body in take-up position or to simultaneously swing the legs and the hood whereby to lift the body into load-carrying position and cause the hood to close the front end of the same.

3. In an excavating scraper, the combination of a body, relatively shiftable supports for the body, a hood mounted adjacent the front end of the body and carried by one of said supports, and means for relatively shifting some of the body supports whereby to simultaneously shift the body from take-up position to load-carrying position and cause the hood to close the front end of the same.

4. In an excavating scraper, the combination of a body, a hood mounted adjacent the front end of the body, a drum mounted at the rear end of the body, a guide at the front end of the body, and a cable having its ends secured to the hood and its intermediate portion trained around the said guide and around the drum whereby rotation of the drum will shift the hood to operative or inoperative position.

5. In an excavating scraper, the combination of a scraper body, legs pivotally mounted upon the sides of the body adjacent the front end thereof and extending above the body, a hood carried by the upper ends of the said legs and extending across the body and provided at its ends with wings adapted to fit within the body close to the sides of the same, and means for swinging the legs and the hood whereby the body may be set in take-up position or in load-carrying position and the hood simultaneously disposed above the body or across the front end thereof.

In testimony whereof we affix our signatures.

JOHN L. STULL. [L. S.]
CHARLES E. STULL. [L. S.]